Figure 1:
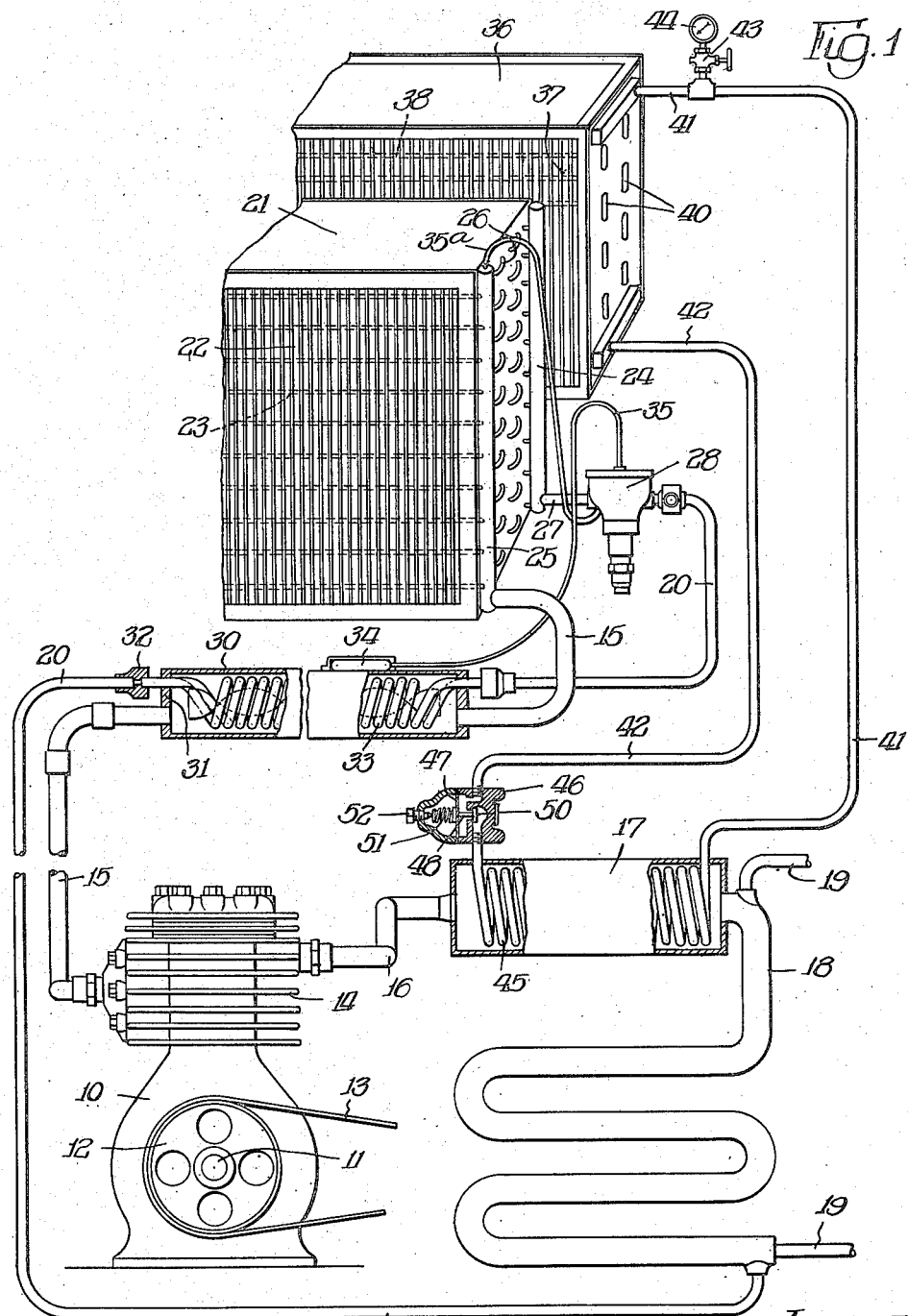

Patented Mar. 22, 1938

2,111,618

UNITED STATES PATENT OFFICE 2,111,618

AIR CONDITIONING APPARATUS

Fred R. Erbach, Beloit, Wis., assignor to General Refrigeration Corporation, Beloit, Wis., a corporation of Delaware Application June 26, 1935, Serial No. 28,398

9 Claims. (Cl. 62—129)

The invention relates to refrigerating equipment for conditioning air and has particular reference to improved means for reheating the conditioned air to raise its temperature and reduce its relative humidity so that the air leaving the reheater will be within the "comfort zone".

Air that has been conditioned by means of an evaporator or dehumidifier is heated in order that the air delivered to the enclosure or room may not be too cool or too humid for the comfort of the occupants. In conditioning the air it is frequently necessary to cool the same to 35 or 40 degrees Fahrenheit outlet temperature in order to remove the moisture which is in the air. In some localities there may be frequent muggy weather conditions which result from excessive moisture in the air but with an air temperature of 85 or 90 degrees Fahrenheit. Under these conditions cooling of the air is not entirely necessary other than to remove the moisture but it is desirable to reheat the conditioned air in both instances to raise the dry bulb temperature thereof and to lower its relative humidity for the greatest comfort of the occupants.

Reheating of the conditioned air has been accomplished by passing the same over steam heating coils or by mixing the conditioned air with warm air drawn from the outside or with some of the air from the enclosure as both have a higher temperature and a lower relative humidity than the air after the same has been conditioned.

An object of the invention is to provide refrigerating equipment having improved apparatus for conditioning air and which will properly cool the air and subsequently raise its temperature in a controlled degree with a corresponding drop in its relative humidity so that the air supplied to the room or enclosure will be best suited to the comfort of the occupants.

Another object is to provide apparatus for conditioning air that will include as part of the equipment thereof a reheater which will utilize the available heat in the refrigerating cycle for returning to the conditioned air a portion of the heat abstracted therefrom during cooling.

Another object is to provide a reheater for the purposes described which will be supplied with a heating medium operating on a closed thermocycle, the medium flowing through the reheater and giving up its heat to the conditioned air and then in turn abstracting heat from the condenser of the refrigerating equipment, said heat being abstracted before any heat is rejected by the condenser.

Another object is to provide apparatus for reheating air conditioned by mechanical refrigeration that will operate automatically by re-evaporation in a thermally balanced secondary system to supply the required heat in response to the temperature of the conditioned air flowing through the reheater.

With these and other objects in view, the invention may consist of certain novel features of construction and operation as will be more fully described and particularly pointed out in the specification, drawings and claims appended hereto.

In the drawings which illustrate an embodiment of the device and wherein like reference characters are used to designate like parts—

Figure 2:
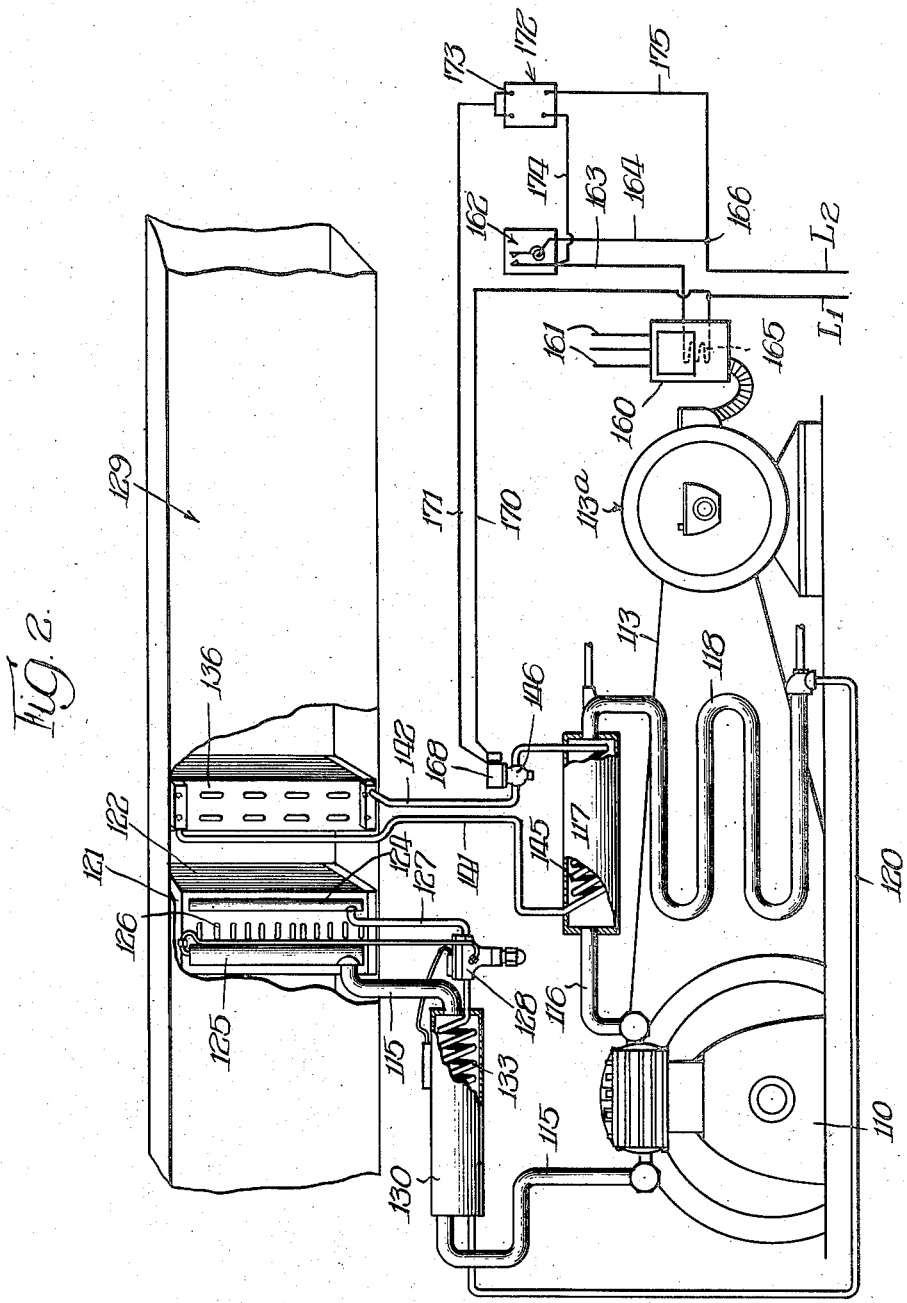

Figure 1 is a diagrammatic view of a mechanical refrigerating system including an evaporator for conditioning air and showing the improved reheater of the invention associated therewith; and Figure 2 is a diagrammatic view of a modified arrangement of air conditioning apparatus embodying the improved reheater of the invention which is shown equipped with humidity control means.

The refrigerating system that has been selected for illustration is of the compression expansion type and consists of a compressor 10 of the usual type having an operating shaft 11 to which is secured pulley 12, driven through belt 13 by an electric motor or other suitable source of power, not shown, to cause rotation of said operating shaft. The cylinder of the compressor is formed with a plurality of fins 14 providing cooling surfaces for the cylinder, which is supplied with evaporated refrigerant by the suction line 15 connecting therewith. The evaporated refrigerant is compressed as the compressor is driven, the temperature and pressure of the refrigerant gas being thereby raised and which is then delivered to the supply line 16.

The refrigerant gas from the compressor discharge line 16 enters shell 17 of a heat interchanger which is interposed in said supply line, the same continuing from the opposite end of the interchanger and entering a condenser designated in its entirety by 18. Said condenser consists of an outer tube coiled as shown and having an interior tube 19 extending therethrough substantially concentric with the outer tube. The condenser is joined at its lower end to the liquid refrigerant supply line 20 and operates on the counter-flow principle, the refrigerant gas flowing through the same in one direction while a cooling medium, preferably water, flows through the tube 19 in the opposite direction.

The evaporator of the refrigerating equipment comprises a frame 21 positioning a plurality of vertical fins 22 which are spaced as shown and extend from end to end of the frame. A plurality of horizontally disposed tubes 23 extend through openings in the fins and are joined to a liquid header 24 and to a suction header 25, respectively, being connected by other tubes and by return bends 26 to comprise a plurality of coils arranged in tiers. It will be understood that each coil connects with the liquid header and with the suction header, forming a complete evaporating unit in itself and that the frame consists of a plurality of these evaporating units. The liquid header 24 is joined by tube 27 with the expansion valve 28, while the suction header 25 is connected by the suction line 15 to a drum 30 forming the shell of a heat interchanger. The drum is provided with end portions 31 preferably integral therewith, one end portion having one section of the suction line 15 fixed thereto while the other end portion of the drum joins with the other section of the suction line so that the complete suction line from compressor to header includes the drum 30. The liquid line 20 leading from the condenser 18 connects with fitting 32 which joins the line to a pair of spiral coils 33 located within and extending longitudinally of the drum 30. The coils project from the opposite end of the drum and connect with the fitting, which in turn is joined to the liquid supply line 20, the same comprising a continuation of the line leading from the condenser and which connects the coils with the expansion valve 28.

The expansion valve is provided with a thermostatic bulb 34 connecting with the valve through the capillary tube 35 and which bulb is held in contact with the shell of the heat interchanger. The bulb is readily influenced by temperature changes taking place within the heat interchanger 30 and operates to control the quantity of liquid refrigerant being supplied to the liquid header 24 in response to said temperature changes.

When the evaporator of the refrigerating equipment is employed for conditioning air, the warm air is directed over the fins 22 and tubes 23 which have contact with the air, reducing its temperature and moisture content, the moisture condensing on the outside surface of the tubes and fins. The air leaving the evaporator is too low in temperature for the best comfort of the occupants of the room. The invention provides a heater for adding heat to the conditioned air which consists of a frame 36 similar in construction to the frame 21 of the evaporator. The frame 36 positions a plurality of vertical fins 37 which are spaced from each other and extend from end to end of the frame. A plurality of horizontally disposed tubes 38 extend through the openings in the fins and are joined to each other at their ends by return bends 40 to form a coil with downward feed having connection at one end with the vapor tube 41 and at its other end with the liquid tube 42. A valve 43 having a gauge 44 is positioned in the supply tube for purposes which will be presently described.

The supply tube 41 at its opposite end enters the shell 17 of the heat interchanger associated with the discharge line of the refrigerating system and is joined to the coil 45 supported within the heat interchanger and extending from end to end thereof. The other end of the coil passes out of the shell and connects with an expansion valve designated in its entirety by 46. Said expansion valve is also joined at the tube 42 forming the liquid or return line to the reheater. Said expansion valve is constructed internally by means of a diaphragm 47 to which is fixed a stem 48 carrying the valve 50 having contact with a valve seat provided interiorly of the valve casing, the valve closing off the passage from the suction conduit 42 to the coil 45 when in engagement with its seat. A coil spring 51 rests against the diaphragm on the side opposite the valve 50 and is retained in position by the screw 52. Rotation of the screw will vary the tension exerted by the spring 51 against the diaphragm 47 and will permit the operator to adjust the expansion valve to suit conditions.

From the foregoing it will be observed that the reheater, the expansion valve 46, and the heat interchanger 17 are joined by the supply tube 41 and the liquid tube 42 to form a closed system. The same may be charged through the purging and charging valve 43 with the same kind of refrigerant as used in the main refrigerating system or it may contain any other suitable refrigerant such as alcohol, carbon tetrachloride, sulphur dioxide or methyl chloride. The system is complete in itself and need have no connection to the evaporator for cooling the air. The reheater functions similar to a condenser as the refrigerant gas supplied to the same by the tube 41 is condensed due to the cooling action of the cooled air, which is caused to travel through the reheater. This condensing of the refrigerant gas changes the same to its liquid state which is then delivered by tube 42 to the expansion valve by gravity flow. It will be noted that the reheater and heat interchanger coils have the same internal pressure.

The expansion valve can be adjusted to suit the particular conditions of operation of the evaporator and when once adjusted will be practically automatic in controlling the quantity of liquid refrigerant flowing through the same and into the coil 45 of the heat interchanger. The pressure within the closed system is entirely dependent upon the temperature existing in the reheater and of course the characteristics of the gas used in the system. When the temperature of the cooled air leaving the evaporator drops below a certain minimum an excess quantity of refrigerant gas in the auxiliary system will condense in the reheater, resulting in a low pressure in the system, which will act on the valve 50. The coil spring 51 over-balances the pressure acting on the valve, causing the valve to open, supplying the heat interchanger with liquid refrigerant which is immediately evaporated and delivered to the reheater to raise the temperature of the cooled air. In the event the air leaving the evaporator is relatively warm, which would require the addition thereto of very little or no heat by the reheater, the expansion valve will operate automatically to take care of this situation, as the pressure in the auxiliary system will build up, which will act on the valve 50 to cause the same to close and shut off the supply of the liquid refrigerant to the reheater. The reheater is therefore automatic in restoring to the cooled air just the proper amount of heat so that the resulting conditioned air will give the greatest comfort to the occupants of a room. Also the expansion valve can be adjusted to suit various refrigerating mediums as well as the particular characteristics of the air being conditioned and other variable factors.

As the cooled air leaving the evaporator is supplied with heat removed from the compressed gas discharged from the high side of the compressor of the refrigerating equipment considerable economy in operation of the air conditioning equipment is secured. A portion of the heat abstracted from the air in conditioning the same is returned to said air by the reheater. This represents a clear gain as the heat would otherwise be dissipated to the cooling water flowing through the condenser 18 of the refrigerating equipment.

The refrigerating system of Figure 2 is similar in all respects to that shown in Figure 1. The compressor 110 is driven through belt 113 by the electric motor 113a. The compressor has connection with a suction line 115 supplying the evaporated refrigerant thereto and a discharge line 116 which delivers the high pressure, high temperature refrigerant gas to the drum 117. The refrigerating system also includes a heat interchanger consisting of drum 130 having connection at its respective ends to the suction line 115 and housing the coil 133 receiving the liquid refrigerant from the condenser 118 and delivering the same to the expansion valve 128.

The evaporator of the equipment above described is located within a supply or return duct 129, the air from the room or enclosure being delivered to the duct at its left hand end and being discharged at its right hand end. The air in passing through the duct is cooled by the evaporator, comprising a frame 121 positioning a plurality of vertical fins 122 and horizontal tubes which extend through openings in the fins and are joined by the return bends 126. The evaporator is otherwise constructed similar to that described with respect to Figure 1, having a liquid header 124 joined by tube 127 to the expansion valve and a suction header 125, both of which connect with the respective ends of the individual evaporating coils formed by the horizontal tubes and return bands as described. The structure functions as a cooling and dehumidifying unit and delivers the cooled air to a reheater also housed within the duct and positioned immediately in advance of said unit. Said reheater is also constructed similar to that described in Figure 1 and has connection with an auxiliary refrigerating system including the vapor tube 141, the liquid line 142, coil 145 and liquid valve 146 for controlling the supply of liquid refrigerant to the coil, the same flowing by gravity through the valve and into said coil. The reheater functions to add heat to the cooled air conditioned by the evaporator, thereby raising its temperature and lowering its relative humidity. The heat restored by the reheater has been abstracted from the high temperature refrigerant gas by the coil 145 and it will be understood that the auxiliary refrigerating system including the reheater has operated to utilize the heat that would otherwise be rejected to the condenser in raising the temperature of the cooled air, all as more particularly described with respect to Figure 1. In the apparatus of Figure 2 the reheater operates in response to the humidity of the air in the room.

The motor 113a for driving the compressor is electrically connected through the switch box 160 to a source of electric current represented by the conductors 161 of a three-phase electric circuit. The actuation of the motor starting switch, which is within the box 160, is controlled by a thermostat 162. The terminals of said thermostat are connected by conductors 163 and 164, the former joining with a solenoid 165 located within the switch box, which in turn has connection with one side of a source of current supply represented by L¹ and L². The other side L² of the electric line is joined at 166 with the conductor 164 so that the complete circuit includes the thermostat 162 and the solenoid 165. When the temperature of the air in the room has reached a predetermined maximum, the contacts of the thermostat will close, energizing solenoid 165, causing actuation of the motor starting switch and operation of the compressor 110 which will have the effect of initiating the refrigeration action of the cooling unit to thereby lower the temperature of the air in the room.

In accordance with the invention the reheater has automatic operation responsive to the humidity of the air in the room. This is accomplished by a solenoid 168 associated with the liquid valve 146 and operating to open and close said valve. The solenoid is electrically connected to conductors 170 and 171. When current is supplied to said solenoid through the conductors mentioned the same is energized to open the valve; permitting a flow of liquid refrigerant through the valve, which flows by gravity to the coil 145. Energization of the solenoid as above described is caused by a humidistat 172 consisting of a double pole, single throw switch. Conductor 171 is joined to the two upper terminals 173 of said humidistat switch, while conductors 174 and 175 connect with the base terminals of said switch, the former connecting with conductor 163 and through the solenoid 165 with L¹ while conductor 175 joins with L². It will be clear from the description and drawings that the solenoid 168 also has connection to one side of the electric supply line, namely, L¹, while the conductor 171, the humidistat, and the conductor 175 provide a connection to the other side L² of the electric supply line. The humidistat therefore controls the operation of both solenoids and when the humidity of the air of the room reaches a predetermined upper limit the humidistat will close the circuits, energizing solenoids 165 and 168, starting the compressor and opening the liquid valve 146. However, the thermostatic means 162 will result in starting the compressor 110 independently of the control for the liquid valve 146.

The invention is not to be limited to the compression expansion type of refrigerant cycle but may be applied to other equipment where heat is abstracted at a relatively low temperature and delivered at a high temperature to a condenser or similar apparatus.

What is claimed is:

1. Apparatus for conditioning air including an evaporator, compressor and condenser comprising a complete refrigerating system, said evaporator cooling the air to a temperature below that desired for the conditioned air, a reheater for heating the air to the temperature desired, said reheater forming part of an auxiliary heat transfer system using a volatile refrigerant and restoring to the cooled air a portion of the heat delivered by said compressor, and an expansion valve in said auxiliary system for controlling the quantity of heat restored to the cooled air by said reheater.

2. Apparatus for conditioning air including an evaporator, compressor and condenser comprising a complete refrigerating system, said evaporator cooling the air to a temperature below that desired for the conditioned air, a reheater for heating the air to the desired temperature, said reheater forming part of an auxiliary heat transfer system using a volatile refrigerant and restoring to the cooled air a portion of the heat delivered by said compressor, an expansion valve in said auxiliary system for varying the quantity of heat restored to the cooled air by said reheater, electro-magnetic means for operating said valve, and a humidistat connected in circuit with said electro-magnetic means for actuating the same in response to the humidity of the air in the room.

3. Apparatus for conditioning air including an evaporator, compressor and condenser comprising a complete refrigerating system, said evaporator cooling the air to a temperature below that desired for the conditioned air, thermostatic means controlling the operation of said refrigerating system in response to room temperature, a reheater for adding heat to the cooled air leaving the evaporator, said reheater forming part of an auxiliary heat transfer system using a volatile refrigerant and restoring to the cooled air a portion of the heat delivered by said compressor, a valve in said auxiliary system for varying the quantity of heat restored to the cooled air by said reheater, electro-magnetic means for operating said valve, and a humidistat connected in circuit with said electro-magnetic means for actuating the same in response to the humidity of the air in the room, whereby said reheater has operation independently of that of the main refrigerating system.

4. Apparatus for conditioning air including an evaporator and condenser of a refrigerating system, said evaporator cooling the air to a temperature below that desired for the conditioned air, an auxiliary heat transfer system using a volatile refrigerant associated with said refrigerating system and including a reheater and a heat interchanger, said reheater reheating the air cooled by the evaporator to the temperature desired for the conditioned air, and said heat interchanger being in heat exchanging relation with the condenser of the refrigerating system.

5. Apparatus for conditioning air including an evaporator and condenser of a refrigerating system, said evaporator cooling the air to a temperature below that desired for the conditioned air, an auxiliary heat transfer system associated with said refrigerating system, said heat transfer system using a volatile refrigerant and including a reheater and a heat interchanger, said reheater heating the air cooled by the evaporator to the temperature desired for the conditioned air, and said heat interchanger being in heat exchanging relation with the condenser of the refrigerating system, and an expansion valve in said auxiliary heat transfer system between the outlet of the reheater and the inlet to the heat interchanger.

6. Apparatus for conditioning air including an evaporator and condenser of a refrigerating system, said evaporator cooling the air to a temperature below that desired for the conditioned air, an auxiliary heat transfer system associated with said refrigerating system, said auxiliary system using a volatile refrigerant and comprising a closed system including a reheater and a heat interchanger, said reheater heating the air cooled by the evaporator to the temperature desired for the conditioned air, and said heat interchanger being in heat exchanging relation with the condenser of the refrigerating system, and an expansion valve in said auxiliary heat transfer system located near the inlet to the heat interchanger for controlling the quantity of heat restored to the cooled air by said reheater, said reheater having a location with respect to the heat interchanger so as to supply liquid refrigerant to said valve by gravity.

7. Apparatus for conditioning air including an evaporator, compressor and condenser comprising a complete refrigerating system, said evaporator cooling the air to a temperature below that desired for the conditioned air, an auxiliary heat transfer system associated with said refrigerating system, said auxiliary system using a volatile refrigerant and comprising a closed system including a reheater and a heat interchanger, said reheater heating the air cooled by the evaporator to the temperature desired for the conditioned air, and said heat interchanger being in heat exchanging relation with the condenser of the refrigerating system, and an expansion valve in said auxiliary heat transfer system between the outlet of the reheater and the inlet to said heat interchanger for controlling the quantity of heat restored to the cooled air by said reheater, said valve being constructed and arranged to operate in accordance with variations in pressure within the heat interchanger.

8. Apparatus for conditioning air including an evaporator, compressor and condenser comprising a complete refrigerating system, said evaporator cooling the air to a temperature below that desired for the conditioned air, an auxiliary heat transfer system associated with said refrigerating system, said heat transfer system using a volatile refrigerant and including a reheater and a heat interchanger, said reheater heating the air cooled by the evaporator to the temperature desired for the conditioned air, and said heat interchanger being in heat exchanging relation with the condenser of the refrigerating system, an expansion valve in said auxiliary heat transfer system located adjacent the inlet to said heat interchanger for controlling the quantity of heat restored to the cooled air by said reheater, and electro-magnetic means for operating said valve.

9. Apparatus for conditioning air including an evaporator, compressor and condenser comprising a complete refrigerating system, said evaporator cooling the air to a temperature below that desired for the conditioned air, an auxiliary heat transfer system associated with said refrigerating system, said heat transfer system using a volatile refrigerant and including a reheater and a heat interchanger, said reheater heating the air from the evaporator to the temperature desired for the conditioned air, and said heat interchanger being in heat exchanging relation with the condenser of the refrigerating system, an expansion valve in said auxiliary heat transfer system located adjacent the inlet to the heat interchanger for controlling the quantity of heat restored to the cooled air by said reheater, electro-magnetic means for operating said valve, and a humidistat in circuit with said electro-magnetic means for actuating the same in response to the humidity of the air in the room.

FRED R. ERBACH.